(12) United States Patent
Yang et al.

(10) Patent No.: US 8,641,301 B2
(45) Date of Patent: Feb. 4, 2014

(54) CAMERA ANGLE ADJUSTMENT

(75) Inventors: Cheng-Yi Yang, Taipei (TW); Hai-Lung Hung, Taipei (TW)

(73) Assignee: Hewlett-Packard Development Company, L.P., Houston, TX (US)

(*) Notice: Subject to any disclaimer, the term of this patent is extended or adjusted under 35 U.S.C. 154(b) by 20 days.

(21) Appl. No.: 13/436,485

(22) Filed: Mar. 30, 2012

(65) Prior Publication Data

US 2013/0259462 A1 Oct. 3, 2013

(51) Int. Cl.
*G03B 17/00* (2006.01)

(52) U.S. Cl.
USPC ........ 396/428; 396/429; 348/207.1; 348/373; 361/679.23; 361/679.27

(58) Field of Classification Search
USPC .......... 396/428–429; 348/333.06, 373, 207.1; 361/679.27, 679.23
See application file for complete search history.

(56) References Cited

U.S. PATENT DOCUMENTS

| 7,286,181 | B2* | 10/2007 | Cha ............................... 348/373 |
| 7,412,163 | B2* | 8/2008 | Wu ................................ 396/429 |
| 7,431,253 | B2 | 10/2008 | Yeh |
| 7,596,832 | B2* | 10/2009 | Hsieh et al. ................... 348/373 |
| 2006/0152614 | A1* | 7/2006 | Wang et al. ............. 348/333.06 |
| 2006/0282866 | A1 | 12/2006 | Kuo |
| 2007/0136992 | A1 | 6/2007 | Lu et al. |
| 2007/0165372 | A1 | 7/2007 | Ye |

FOREIGN PATENT DOCUMENTS

| DE | 202006006022 | 8/2006 |
| KR | 20100025041 | 3/2010 |
| TW | 200725218 | 7/2007 |

* cited by examiner

*Primary Examiner* — Christopher Mahoney
(74) *Attorney, Agent, or Firm* — Neel Patel (57) ABSTRACT

Example embodiments disclosed herein relate to adjusting an angle of a camera included in display unit that connects to a base unit. The display unit may include a camera mount to house the camera. The camera mount is to adjust a viewing angle of the camera relative to the display unit in response to a change of a hinge angle between the display unit and the base unit.

14 Claims, 9 Drawing Sheets

CAMERA ANGLE ADJUSTMENT

BACKGROUND

Case designs of devices are increasingly changing to accommodate for user preferences. For example, some cases accommodate for a camera to be inserted above a display portion of the case so that the user may conveniently capture video and/or still images without the need for peripheral devices. A position of the display portion may generally be adjustable according to a user's preference.

BRIEF DESCRIPTION OF THE DRAWINGS

The following detailed description references the drawings, wherein.

DETAILED DESCRIPTION

Specific details are given in the following description to provide a thorough understanding of embodiments. However, it will be understood by one of ordinary skill in the art that embodiments may be practiced without these specific details. For example, systems may be shown in diagrams in order not to obscure embodiments in unnecessary detail. In other instances, well-known processes, structures and techniques may be shown without unnecessary detail in order to avoid obscuring embodiments.

Cases of devices including displays, such as notebooks and desktops, may be designed to house a camera, such as a webcam, around a display portion of the case. The display portion may house the display and be part of a display unit of the case. The display unit may be attached to a hinge. Users may change a position of the display unit to more clearly view the display housed in the display portion. For example, users of different heights and/or different distances away from the case may choose the tilt the display unit forward or backward. The display unit may pivot around the hinge when tilted. However, when the display unit is tilted, the camera may also be tilted to an undesirable position. For example, if the display unit is tilted back, the camera, which originally pointed towards the user, may now point upward.

Embodiments may provide a device and/or method for adjusting a viewing angle of the camera without user intervention, if the display unit is adjusted. For example, an embodiment may include a base unit, a display unit and a hinge. The display unit may include a camera mount to house a camera. The hinge may connect the base unit to the display unit. The camera mount is to adjust a viewing angle of the camera relative to the display unit in response to a change of a hinge angle at the hinge between the display unit and the base unit. Thus, the viewing angle of the camera may change automatically such that the camera points towards the user each time after the user tilts the display unit.

Figure 1A:
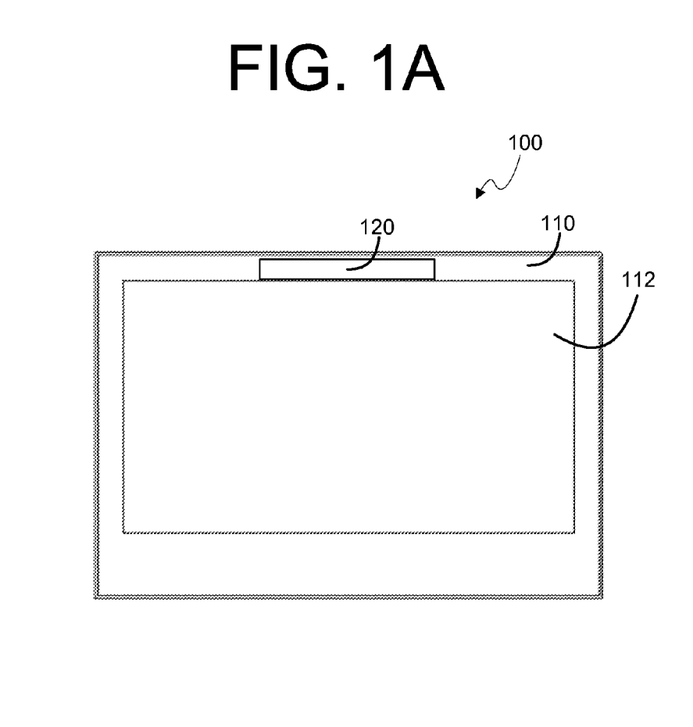
FIG. 1A is an example diagram of a front view of a case including a camera mount.
Figure 1B:
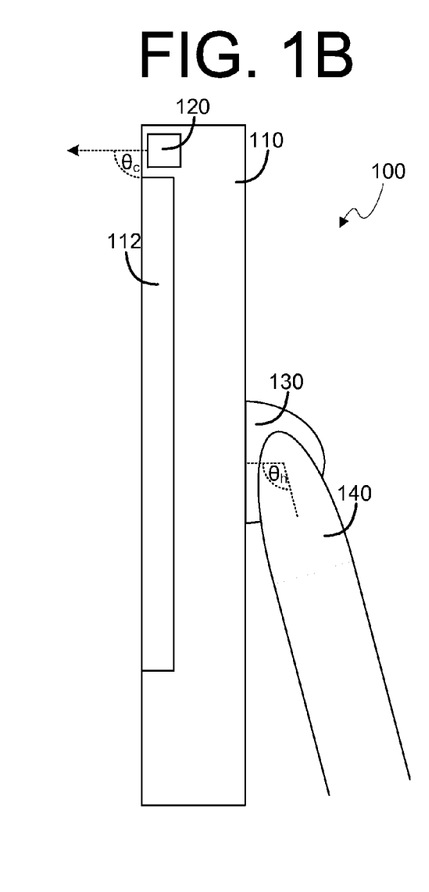
FIG. 1B is an example diagram of a side view of the case of FIG. 1A at a neutral position.
Figure 1C:
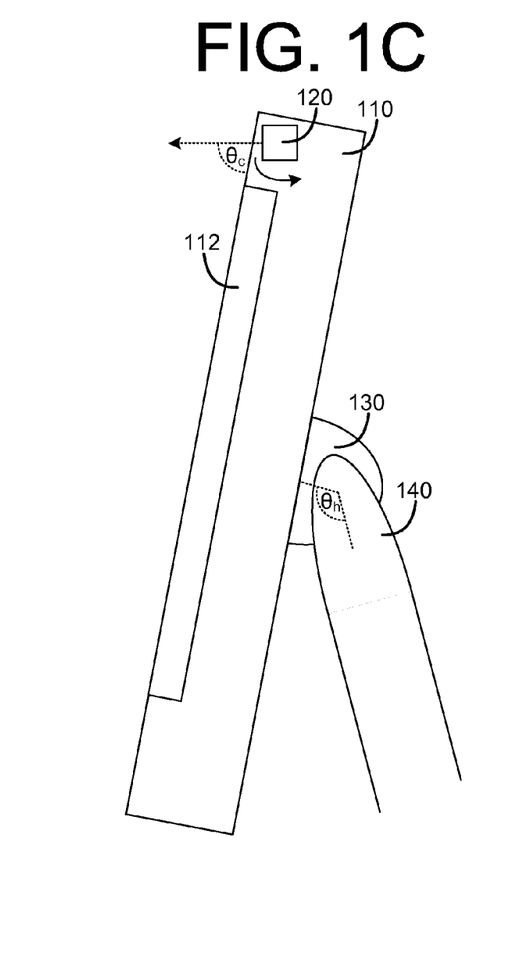
FIG. 1C is an example diagram of a side view of the case of FIG. 1A at a back position.
Figure 1D:
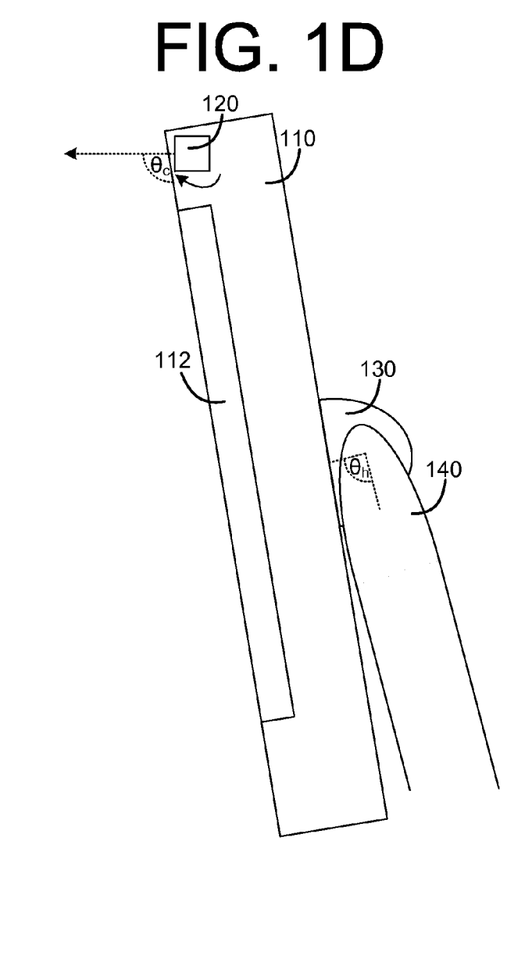
FIG. 1D is an example diagram of a side view of the case of FIG. 1A at a forward position.

Looking at the drawings, FIG. 1A is an example diagram of a front view of a case 100 including an adjustable camera mount 120 and FIG. 1B is an example diagram of a side view of the case 100 of FIG. 1A at a neutral position. Further, FIG. 1C is an example diagram of a side view of the case 100 of FIG. 1A at a back position and FIG. 1D is an example diagram of a side view of the case 100 of FIG. 1A at a forward position. The case 100 may include or be part of any type of electronic device including a display and a camera, such as a monitor, a notebook computer, a desktop computer, an all-in-one system, a slate computing device, a portable reading device, a wireless email device, a mobile phone, a computing system and the like.

As shown in FIG. 1A, the case 100 includes a display unit 110 and a camera mount 120 within the display unit 110. The display unit 110 may house a display and the camera mount 120 may house a camera. The term display may refer to any type of electronic visual display device. Examples of the display may include an integrated display device, such as a Liquid Crystal Display (LCD) panel, a plasma panel, or other type of display panel. The term camera may include any type of device that records an image, such as a still camera, video camera, webcam, and the like. The camera mount 120 is located above a display portion 112 of the display unit 110. An example of the camera mount 120 will be described in more detail below with respect to FIGS. 2A to 4C and 7A to 8B.

As shown in FIGS. 1B to 1D, the case 100 also includes a hinge 130 and a base unit 140. The hinge 130 connects the base unit 140 to the display unit 110. The term base unit 140 may be refer to any type of member that supports the display unit 110. An example of the hinge 130 will be described in more detail below with respect to FIGS. 5A to 6C.

As shown in FIGS. 1B to 1D, the camera mount 120 is to adjust a viewing angle $\theta_c$ of the camera relative to the display unit 110 in response to a change of a hinge angle $\theta_h$ at the hinge 130 between the display unit 110 and the base unit 140. For example, in FIG. 1B, the camera mount 120 points the camera ahead in a direction generally perpendicular to a surface of the display portion 112 of the display unit 110. However, if the display unit 120 tilts upwards, the camera mount 120 will compensate by pointing the camera downward with respect to the camera mount 120 shown in FIG. 1B during the neutral position, as shown in FIG. 1C. Further, if the display unit 120 tilts downward, the camera mount 120 will compensate by pointing the camera upward with respect to the camera mount 120 shown in FIG. 1B during the neutral position, as shown in FIG. 1D. Thus, as shown in FIGS. 1B to 1D, the viewing angle $\theta_c$ decreases in response to the hinge angle $\theta_h$ increasing and the viewing angle $\theta_c$ increases in response to the hinge angle $\theta_h$ decreasing.

Figure 2A:
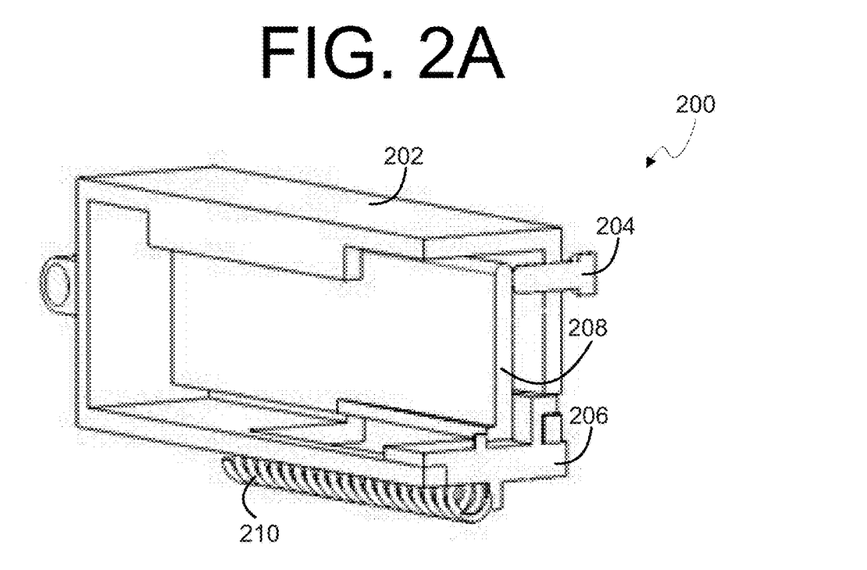
FIGS. 2A and 2B are example diagrams of perspective views of the camera mount of FIG. 1A FIGS. 3A to 3C are example diagrams of perspective, front and side views of the camera mount during the neutral position of the case in FIG. 1B.
Figure 2B:
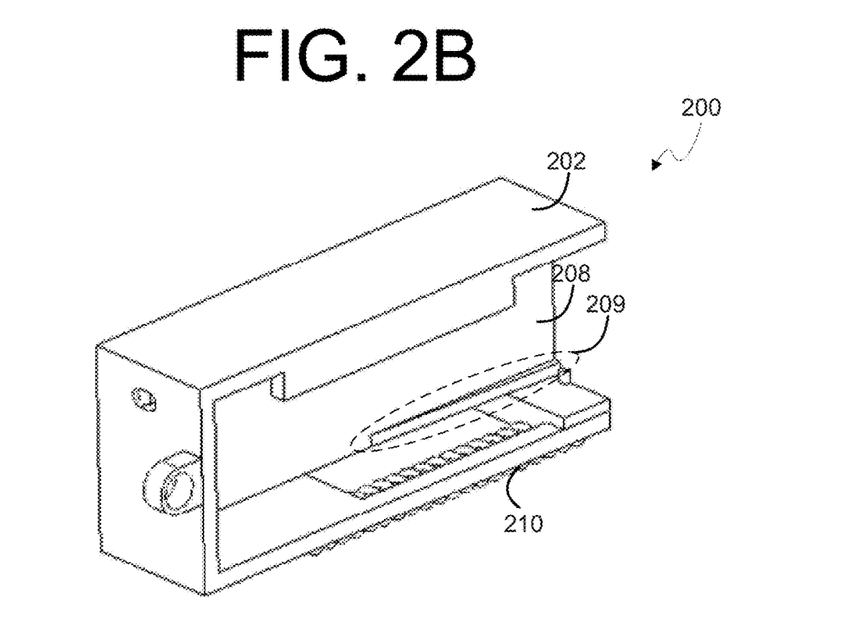

FIGS. 2A and 2B are example diagrams of perspective views of the camera mount 200 of FIG. 1A. FIG. 2A shows the camera mount 200 from a first side and FIG. 2B shows the camera mount 200 from a second side. In the embodiment of FIG. 2A, the camera mount 200 includes an outer member 202, an adjustment member 204, a first slidable member 206, a rotatable member 208 and a first elastic member 210. The outer member 202 may surround at least part of the adjustment member 204, the first slidable member 206 and the rotatable member 208. Further, the outer member 202 may fit into a recess of the display unit 110.

The adjustment member 204 engages the rotatable member along an upper edge of the rotatable member 208 and may pass through the outer member 202. The adjustment member 204 will be explained in greater detail below with respect to FIGS. 7A to 8B. The first slidable member 206 slides along a lower edge of the rotatable member 208. The upper and lower edges are opposite each other.

Further, FIG. 2B shows a part of the lower edge of the rotatable member 208 to include a diagonal edge 209 that is diagonal relative to a movement of the first slidable member 206. The first slidable member 206 is to rotate the rotatable member 208 via the diagonal edge 209. For example, the first slidable member 206 may continue to push the lower edge of the rotatable member 208 back while traversing along the diagonal edge 209.

The first elastic member 210 is connected to a first end of the first slidable member 206 and pulls the first slidable member 206 in towards the camera mount 200. The first elastic member 210 may be any type of resilient material or device capable of returning to its original length, shape, etc., after being stretched, deformed, compressed, or expanded, such as the spring shown in FIG. 2A. The first slidable member 206, the rotatable member 208 and the first elastic member 210 will be explained in greater detail below with respect to FIGS. 3A to 4C.

Figure 3A:
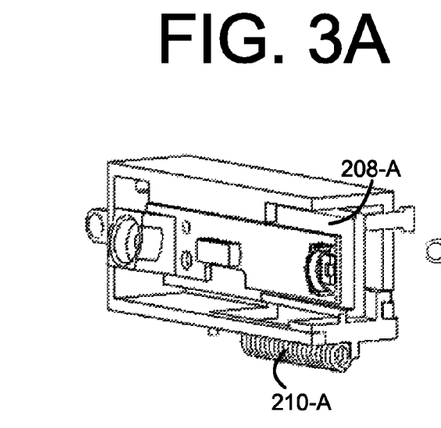
Figure 3B:
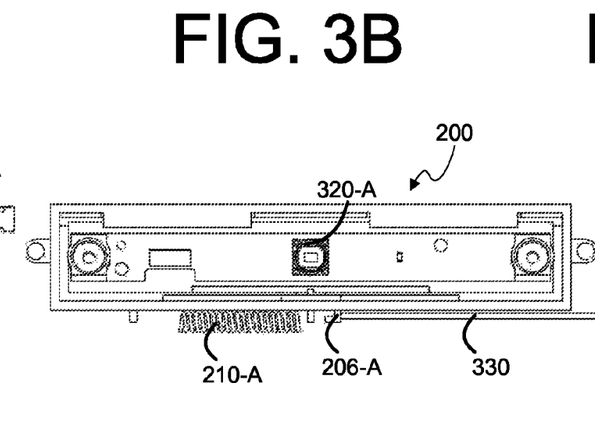
Figure 3C:
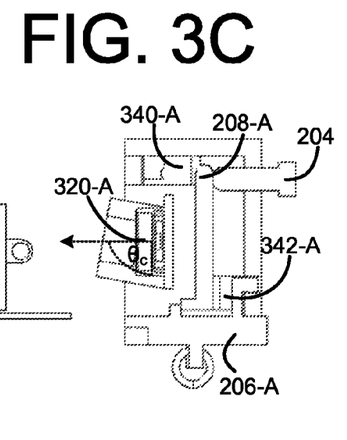
Figures 4A, 4B:
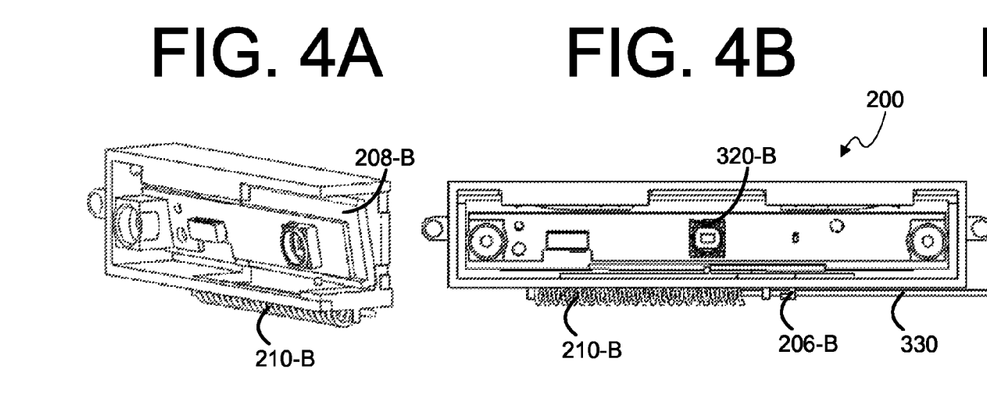
FIGS. 4A to 4C are example diagrams of perspective, front and side views of the camera mount during the back position of the case in FIG. 1C.
Figure 4C:
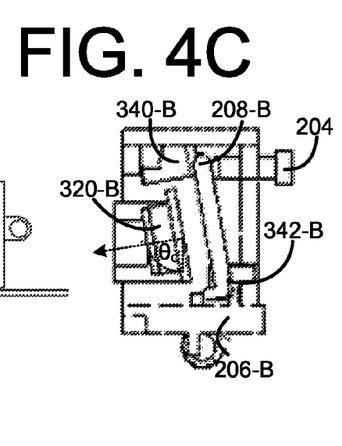

FIGS. 3A to 3C are example diagrams of perspective, front and side views of the camera mount 200 during the neutral position of the case 100 in FIG. 1B. FIGS. 4A to 4C are example diagrams of perspective, front and side views of the camera mount 200 during the back position of the case 100 in FIG. 1C. In FIGS. 3A to 3C, the camera mount 200 is shown to house a camera 320 that engages the rotatable member 320. Further, a cable 330 is shown to attach to a second end of the first slidable member 206. The first elastic member 210 is to maintain a tension in the cable 330.

As noted above, the first slidable member 206 is to move in response to a change in the hinge angle $\theta_h$ and the first slidable member 206 is to control an angle of rotation of the rotatable member 208 of the camera mount 200 to adjust the viewing angle $\theta_c$. The rotatable member 208 may rotate along an axis parallel to that of the hinge 130 to adjust the viewing angle $\theta_c$ of the camera 320 in response to the movement of the first slidable member 206. The axis that the rotatable member 208 of the camera mount 200 rotates around is along the upper edge of the rotatable member 208.

As shown in FIGS. 3B and 3C, when the case 100 is in the neutral position, the first slidable member 206-A is pulled somewhat away from the camera mount 200, thus sliding along part of the diagonal edge 209 of the rotatable member 208. As a result, the lower edge of the rotatable member 208 is pushed in such that the viewing angle $\theta_c$ generally forms a right angle with the surface of the display portion 112 and the camera 320-A points straight ahead.

Further, the camera mount 200 includes first and second resilient members 340-A and 342-A that may push against the rotatable member 208. For example, the first resilient member 340-A may push the upper edge of the rotatable member 308 against the adjustment member 204 and the second resilient member 342-A may push the rotatable member 308 against the first slidable member 206-A.

As shown in FIGS. 4B and 4C, when the case 100 is in the back position, the first slidable member 206-A is pulled even further away from the camera mount 200 than in the neutral position. This causes the first slidable member 206-B to slide further up the diagonal edge 209 of the rotatable member 208. As a result, the lower edge of the rotatable member 208 is pushed further in than during the neutral position, such that the viewing angle $\theta_c$ is less than 90 degrees to the surface of the display portion 112 and the camera 320-B points downward. Further, the second resilient member 342-B may be compressed as the lower edge of the rotatable member 308 is pushed inward by the first slidable member 206-B.

Embodiments are not limited to the above mechanism for rotating the rotatable member 208 or the hinge 530. For example, embodiments may include a servomechanism to rotate the rotatable member 208 and/or the hinge 530, where the servomechanism may receive feedback via a sensor to detect the viewing angle $\theta_c$ and/or hinge angle $\theta_h$.

Figure 5A:
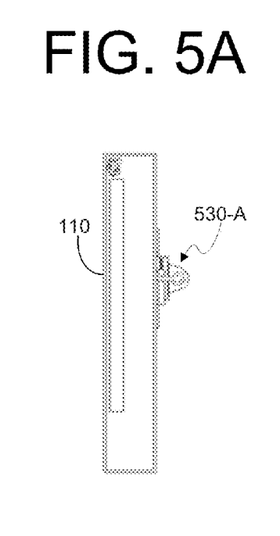
FIG. 5A is an example diagram of a side view of a hinge and a display unit of FIG. 1B during the neutral position.
Figure 5B:
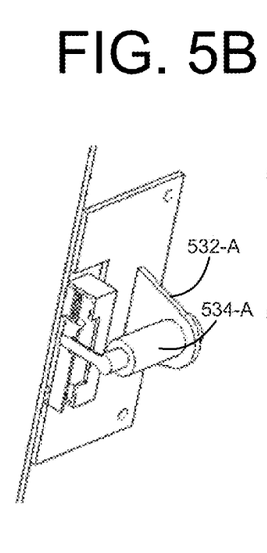
FIGS. 5B and 5C are example diagrams of perspective and side views of the hinge in FIG. 5A.
Figure 5C:
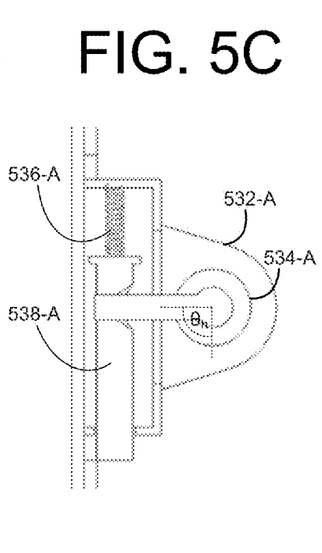
Figure 6A:
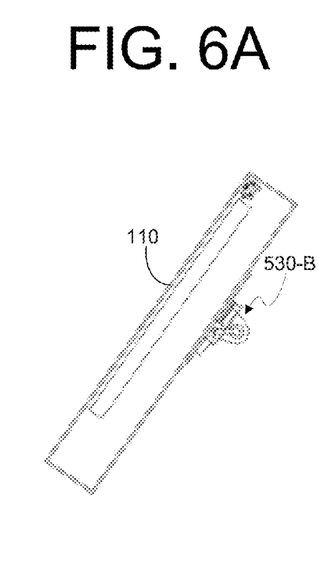
FIG. 6A is an example diagram of a side view of the hinge and the display unit of FIG. 1C during the back position.
Figure 6B:
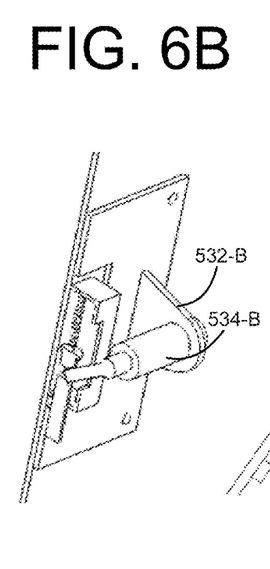
FIGS. 6B and 6C are example diagrams of perspective and side views of the hinge in FIG. 6A.
Figure 6C:
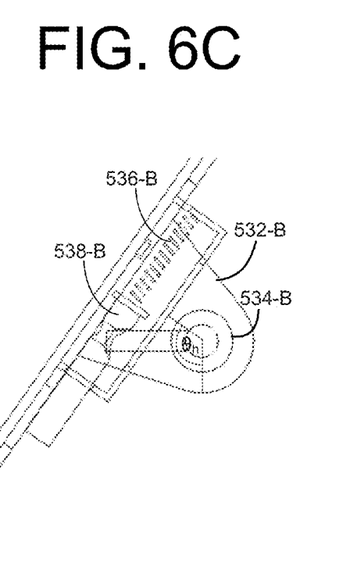

FIG. 5A is an example diagram of a side view of the hinge 530-A and the display unit 110 of FIG. 1B during the neutral position. FIGS. 5B and 5C are example diagrams of perspective and side views of the hinge in FIG. 5A. FIG. 6A is an example diagram of a side view of the hinge 530-B and the display unit 110 of FIG. 1C during the back position. FIGS. 6B and 6C are example diagrams of perspective and side views of the hinge 530-B in FIG. 6A.

In FIGS. 5B and 5C, the hinge 530-A includes a second slidable member 538-A having a first end connected to a connecting member (not shown), such as the cable 330, and a second end connected to a second elastic member 536-A. The second elastic member 536-A is to maintain the tension in the connecting member. Further, the hinge 530-A includes a base member 534-A that connects to a base (not shown), such as the base unit 140 and a display member 532-A that connects to the display unit 110. Further, the base member 534-A connects to the second slidable member 538-A via a protruding member that intersects the second slidable member 538-A.

The display member 532-A is to rotate around the base member 534-A and the hinge angle $\theta_h$ may be measured between the base and display members 532-A and 534-A. As shown in FIGS. 5A to 6C, the display member 532-B is rotated clockwise around the base member 534-B from the neutral position to the back position. The second slidable member 538-B, which moves in relation to the display member 532-B, is thus pulled upwards. In turn, the connecting member, such as the cable 330, pulls the first slidable member 206 away from the camera mount 200. As explained above with respect to FIGS. 3A to 4C, this causes the rotatable member 208, and therefore the camera 320 to rotate downward.

Hence, the viewing angle $\theta_c$ of the camera 320 may be changed in order to continue pointing towards the user. An increase in the tension, such as when the display 110 is tilted backward, may also cause the second elastic member 536-B to be extended. In addition, the protruding member that intersects the second slidable member 538-A may pivot within the second elastic member 536-B as the display member 532-A rotates around the base member 534-A. However, as shown in FIGS. 5C and 6C, the second elastic member 536-B may limit a range of motion of the second slidable member 538, thus limiting a degree to which the display unit 110 may be tilted upward or downward.

Figure 10:
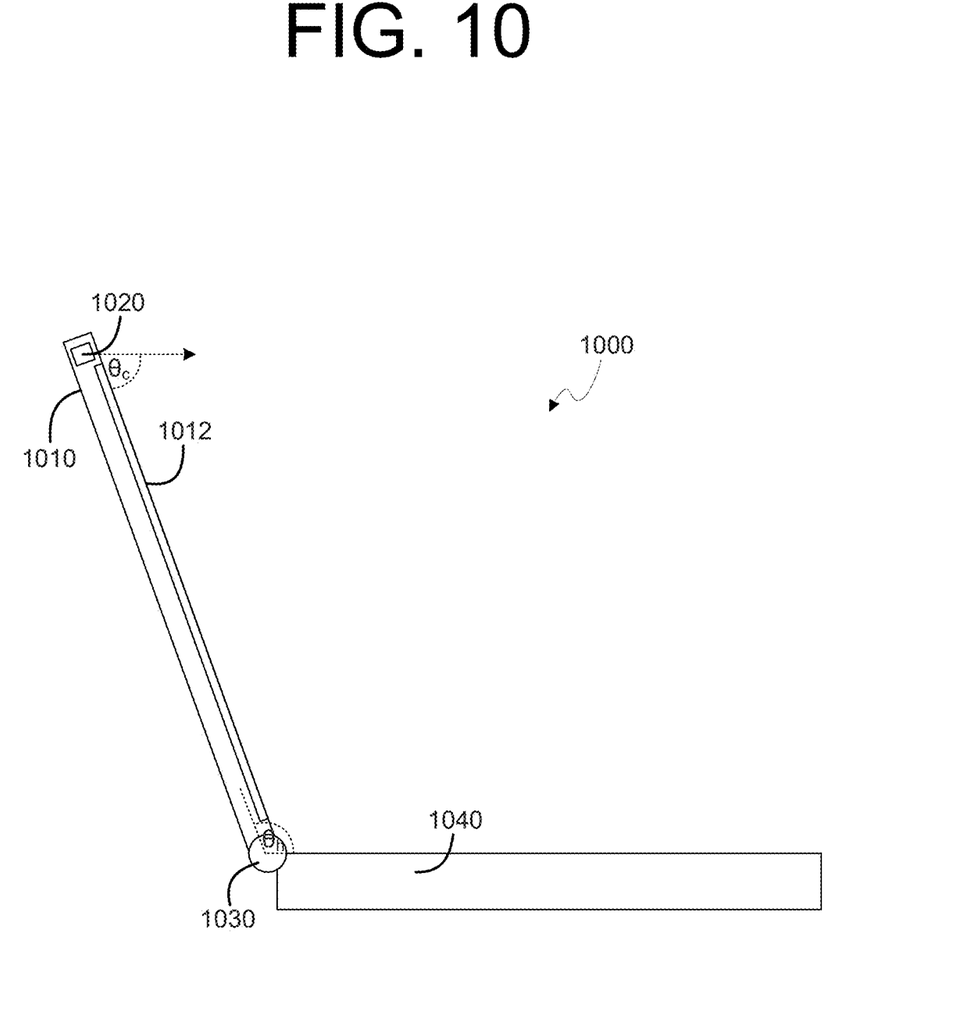
FIG. 10 is another example diagram of a side view of a case including the camera mount.

Hence, the hinge 530 is to push the first slidable member 206 towards the first elastic member 210 if the hinge angle decreases $\theta_h$, and the hinge 530 is to pull the first slidable member 206 away from the first elastic member 210 if the hinge angle $\theta_h$ increases. While the hinge 530-A is shown to be located centrally along a backside of the display unit 110, embodiments are not limited thereto. For example, the hinge 530-A may located a lower edge of the display unit 110, such as if the display unit 110 is part of a laptop device, as shown in FIG. 10.

Figure 7A:
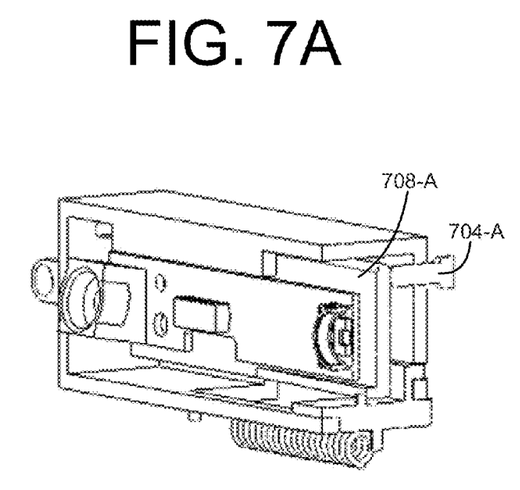
FIGS. 7A and 7B are example diagrams of perspective and side views of the camera mount of FIG. 2A at a first position of an adjustment member.
Figure 7B:
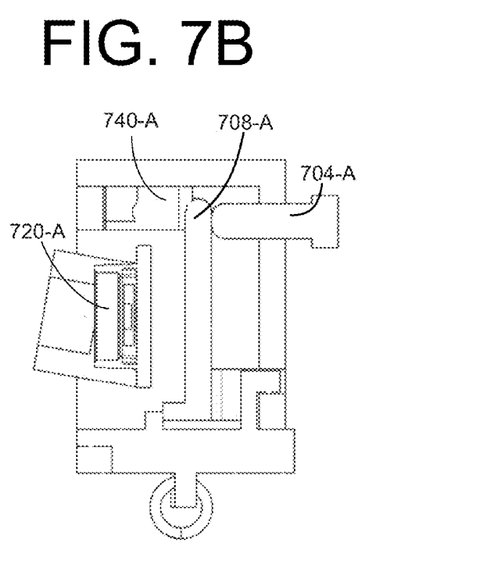
Figure 8A:
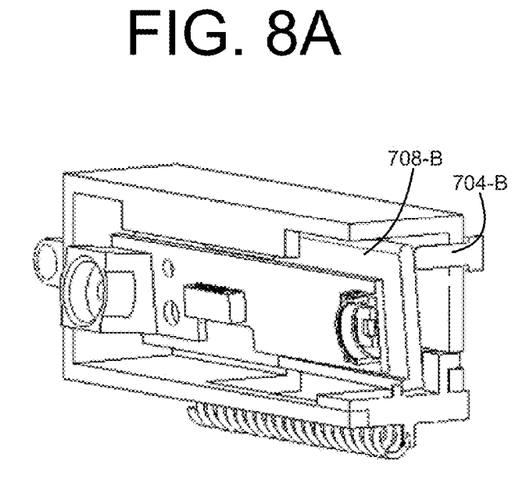
FIGS. 8A and 8B are example diagrams of perspective and side views of the camera mount FIG. 2A at a second position of the adjustment member.
Figure 8B:
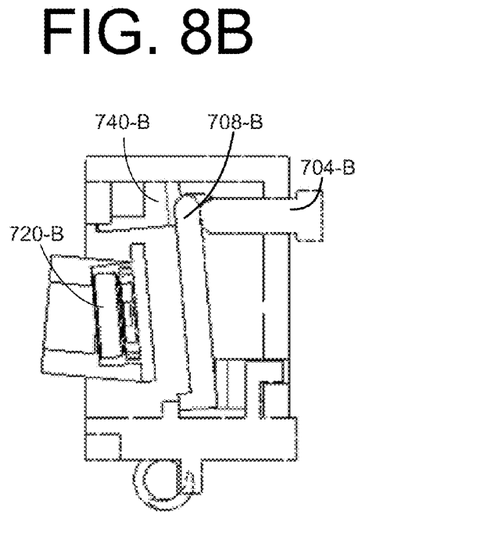

FIGS. 7A and 7B are example diagrams of perspective and side views of the camera mount 200 of FIG. 2A at a first position of the adjustment member 204. FIGS. 8A and 8B are example diagrams of perspective and side views of the camera mount 200 FIG. 2A at a second position of the adjustment member 204. In FIGS. 7A and 7B, the adjustment member 704-A at the first position is shown to abut an upper back surface of a rotatable member 708-A which engages a camera 720-A. Further, a third resilient member 740-A is shown to abut an upper front surface of the rotatable member 708-A, where the third resilient member 740-A is to press the rotatable member 708-A against the adjustment member 704-A. The adjustment member 704 may be any type of mechanism or device for adjusting a position of the upper edge of the rotatable member 208, such as a screw.

As shown in FIGS. 8A and 8B, the adjustment member 704-B may be shifted to the second position that is further into the camera mount 200 and moves a position of the upper edge of the rotatable member 708-B, where the axis of rotation of the rotatable member 708-BA is along the upper edge. Thus, moving the adjustment member 704-B may adjust a position of the axis of rotation of the rotatable member 708-B such that a tilt of the camera 720-B may be preset by the user. Thus, a position of the axis of rotation of the rotatable member 708-A may be settable by the user such that the tilt of the camera 320 with respect to the upper edge of the rotatable member 708-A may also be adjusted.

Figure 9:
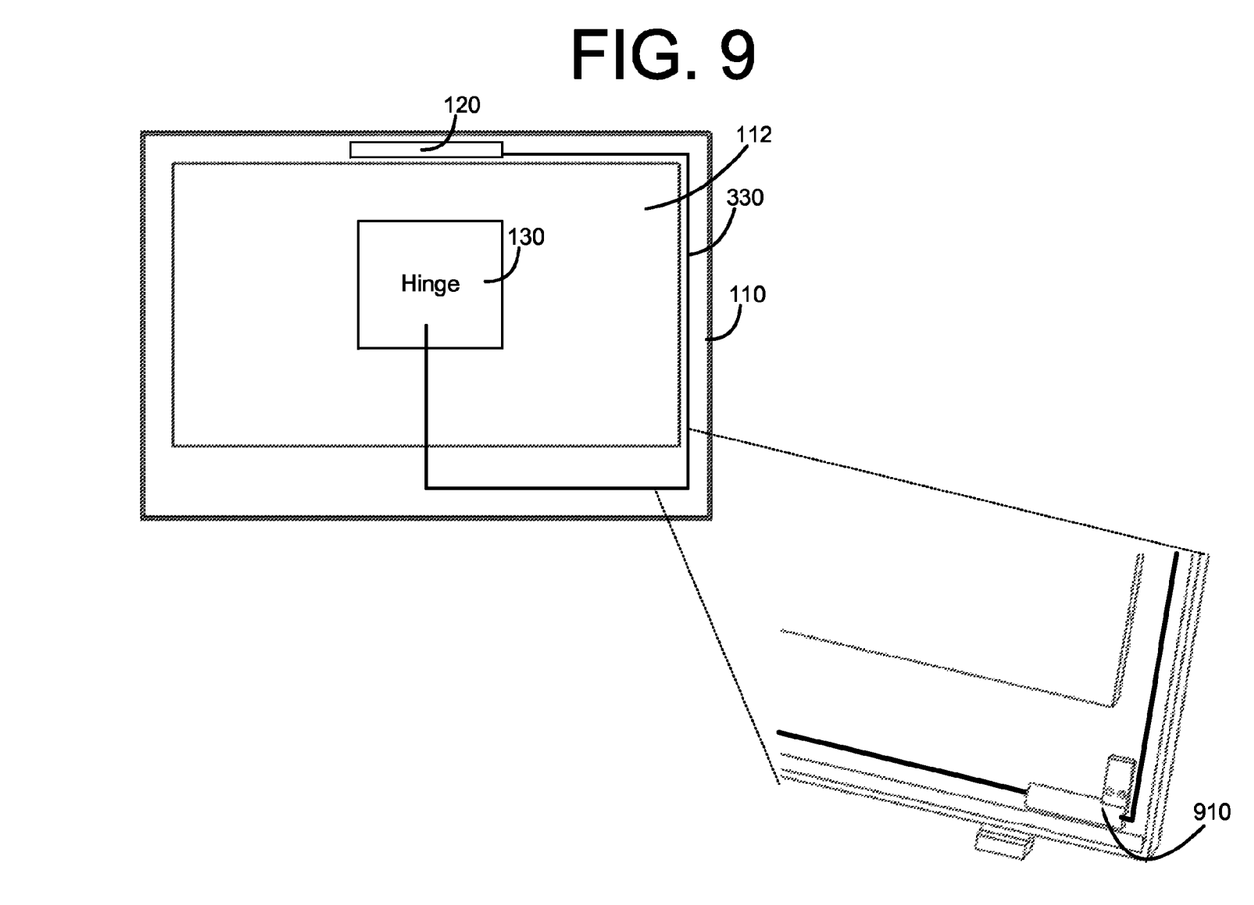
FIG. 9 is an example diagram of an internal view of the case of FIG. 1 showing a connecting member.

FIG. 9 is an example diagram of an internal view of the case of FIG. 1 showing an example of the connecting member, such as a cable 330. In the embodiment of FIG. 9, the connecting member 330 is located along an edge outside the display portion 112. As shown in a blow-up section of FIG. 9, one or more guides 910 may be placed along the edge outside the display portion 112, to direct a path of the connecting member 330.

Further, the connecting member 330 relates a movement of the base unit 140 to a movement of the camera mount 120. For example, the connecting member 330 may adjust a rotational angle $\theta_c$ of the rotatable member 208 of the camera mount 200 relative to the display unit 110 in response to a change in a rotational angle $\theta_h$ of the display unit 110 relative to the base unit 140. Further, the connecting member 330 is to move in response to a change in the rotational angle $\theta_h$ of the display unit 110 relative to the display unit, and the rotational angle $\theta_c$ of the camera mount 120 is to change in response to the movement of the connecting member 330.

FIG. 10 is another example diagram of a side view of a case 1000 including the camera mount 1020. The case 1000 is shown to be part of a notebook or laptop. In the embodiment of FIG. 10, the case 1000 includes a display unit 1010, the camera mount 1020, a hinge 1030 and a base unit 1040, where the display unit 1010 includes a display portion 1012. The display unit 1010, camera mount 1020, hinge 1030 and base unit 1040 of FIG. 10 may be respectively similar to the base unit 110, camera mount 120, hinge 130 and base unit 140 of FIGS. 1A to 1D. However, as shown in FIG. 10, the base unit 1040 and the hinge 1030 may be located along a bottom surface of the display unit 1010, instead of along a back surface of the display unit 1010, like FIGS. 1A to 1D. As described above, the camera mount 1020 is to adjust a viewing angle $\theta_c$ of a camera relative to the display unit 1010 in response to a change of a hinge angle $\theta_h$ at the hinge 1030 between the display unit 1010 and the base unit 1040.

Figure 11:
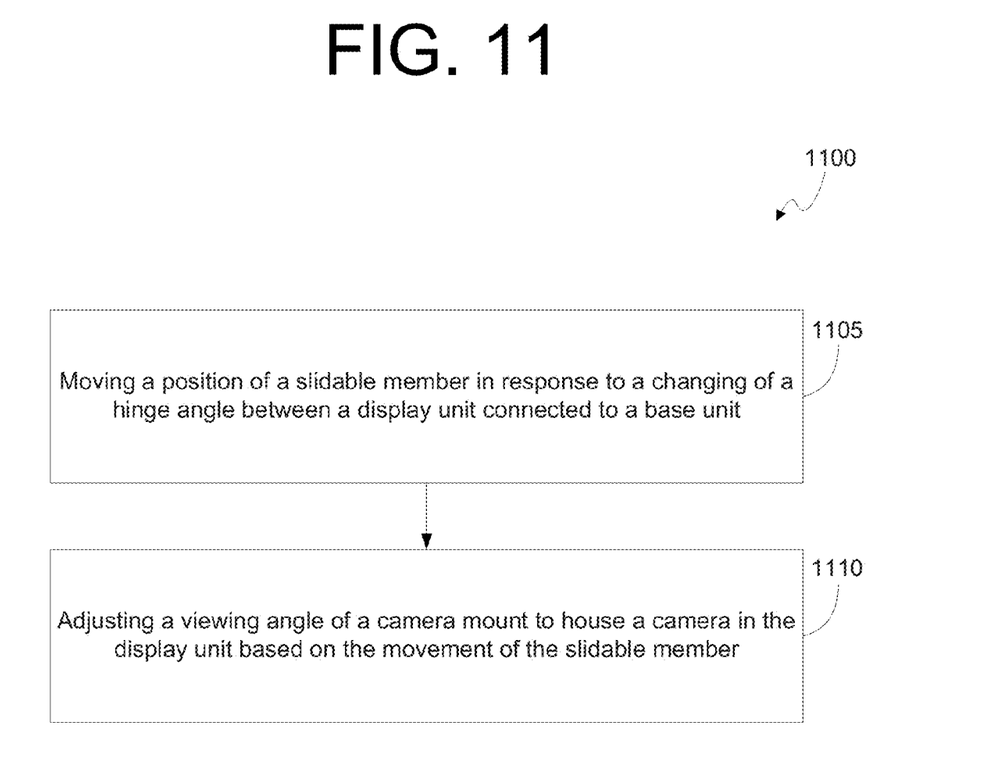
FIG. 11 is an example flow chart for a method of adjusting a camera angle.

FIG. 11 is an example flow chart 1100 for a method of adjusting a camera angle. Although execution of method 1100 is described below with reference to the case 100, other suitable components for execution of the method 1100 can be utilized, such as the case 1000. At block 1105, a position of a first slidable member 206 is moved in response to a changing of a hinge angle $\theta_h$ between a display unit 110 connected to a base unit 140. Then, at block 1110, a viewing angle $\theta_c$ of a camera mount 120 to house a camera in the display unit 110 is adjusted based on the movement of the first slidable member 206.

According to the foregoing, embodiments provide a device and/or method for automatically adjusting the viewing angle of a camera included in a display unit when a hinge angle of a display unit is adjusted. For example, a camera mount included in the display unit may adjust a viewing angle of the camera relative to the display unit in response to a change of the hinge angle at a hinge between the display unit and the base unit. Thus, the user may not have to manually readjust the camera to point towards the user each time after the hinge angle changes when user tilts the display unit forward or backward.

What is claimed is:
1. A case, comprising:
a base unit;
a display unit including a camera mount to house a camera, the camera mount including a first slidable member and a rotatable member, where the first slidable member slides linearly along a lower edge of the rotatable member; and
a hinge connecting the base unit to the display unit, wherein
the camera mount is to adjust a viewing angle of the camera relative to the display unit in response to a change of a hinge angle at the hinge between the display unit and the base unit,
the first slidable member is to move in response to a change in the hinge angle, and
the first slidable member is to directly engage the rotatable member along the lower edge of the rotatable member, and the slidable member is to control an angle of rotation of the rotatable member to adjust the viewing angle.
2. The case of claim 1, further comprising:
a first elastic member connected to a first end of the first slidable member; and
a cable to connected to a second end of the first slidable member, wherein
the first elastic member is to maintain a tension in the cable.
3. The case of claim 2, further comprising:
a second slidable member having a first end to connected to the cable; and
a second elastic member connected to a second end of the of the second slidable member, wherein the second elastic member is to maintain the tension in the cable.

4. The case of claim 2, wherein,
the camera mount is above a display portion of the display unit, and
the cable is located along an edge outside the display portion.

5. The case of claim 2, wherein,
the hinge is to push the first slidable member towards the first elastic member if the hinge angle decreases, and
the hinge is to pull the first slidable member away from the first elastic member if the hinge angle increases.

6. The case of claim 2, wherein the hinge includes,
a base member connected to the base unit and to the cable; and
a display member connected to the display unit and to rotate around the base member, the hinge angle being between the base and display members.

7. The case of claim 1, wherein the rotatable member rotates along an axis parallel to that of the hinge to adjust the viewing angle of the camera in response to the movement of the first slidable member.

8. The case of claim 7, wherein,
the axis that the rotatable member of the camera mount rotates along is at an upper edge of the rotatable member, and
the first and seconds edges are opposite each other.

9. The case of claim 8, wherein,
a part of the lower edge of the rotatable member includes a diagonal edge relative to the movement of the first slidable member, and
the first slidable member is to rotate the rotatable member via the diagonal edge.

10. The case of claim 7, further comprising:
an adjustment member to adjust a position of the axis of rotation of the rotatable member to preset a tilt of the camera.

11. The case of claim 1, wherein
the viewing angle decreases in response to the hinge angle increasing, and
the viewing angle increases in response to the hinge angle decreasing.

12. A case, comprising
a display unit including a camera mount, the camera mount to receive a camera and the camera to face outward from the display case, the camera mount including a slidable member, a rotatable member, and an elastic member;
a base unit connected to the display unit; and
a connecting member to relate a movement of the base unit to a movement of the camera mount, wherein
the slidable member is to engage the rotatable member,
the elastic member is to connect to a first end of the slidable member and is to maintain a tension in the connecting member, and
the connecting member is to connect to a second end of the slidable member and is to adjust a rotational angle of the rotatable member of the camera mount relative to the display unit in response to a change in a rotational angle of the display unit relative to the base unit.

13. The case of claim 12, wherein,
the connecting member is to move in response to a change in the rotational angle of the display unit relative to the display unit, and
the rotational angle of the rotational member is to change in response to the movement of the connecting member.

14. A method for adjusting a camera angle, comprising:
moving a position of a slidable member in response to a changing of a hinge angle between a display unit connected to a base unit, where the slidable member slides linearly along a lower edge of a rotatable member;
directly engaging the slidable member to the rotatable member along the lower edge of the rotatable member to control an angle of rotation of the rotatable member; and
adjusting a viewing angle of the rotatable member of a camera mount to house a camera in the display unit based on the movement of the slidable member and the angle of rotation of the rotatable member.

* * * * *

UNITED STATES PATENT AND TRADEMARK OFFICE
CERTIFICATE OF CORRECTION

| | | |
|---|---|---|
| PATENT NO. | : 8,641,301 B2 | Page 1 of 1 |
| APPLICATION NO. | : 13/436485 | |
| DATED | : February 4, 2014 | |
| INVENTOR(S) | : Cheng-Yi Yang et al. | |

It is certified that error appears in the above-identified patent and that said Letters Patent is hereby corrected as shown below:

In the Claims:

In column 6, line 66, in Claim 3, after "second end" delete "of the".

In column 7, line 27, in Claim 8, delete "seconds" and insert -- second --, therefor.

Signed and Sealed this
Third Day of June, 2014

Michelle K. Lee
*Deputy Director of the United States Patent and Trademark Office*